United States Patent
Hansen

(10) Patent No.: US 6,824,832 B2
(45) Date of Patent: Nov. 30, 2004

(54) THERMOSETTING PLASTIC COMPOSITION

(75) Inventor: Richard W. Hansen, Eagle, ID (US)

(73) Assignee: R&J Hansen, L.L.C., Eagle, ID (US)

( * ) Notice: Subject to any disclaimer, the term of this patent is extended or adjusted under 35 U.S.C. 154(b) by 0 days.

(21) Appl. No.: 10/614,720

(22) Filed: Jul. 7, 2003

(65) Prior Publication Data

US 2004/0081819 A1 Apr. 29, 2004

Related U.S. Application Data

(60) Provisional application No. 60/394,350, filed on Jul. 8, 2002.

(51) Int. Cl.⁷ .................................. B05D 3/02
(52) U.S. Cl. .................................. 427/385.5; 427/386
(58) Field of Search .............................. 427/385.5, 386

(56) References Cited

U.S. PATENT DOCUMENTS

| | | |
|---|---|---|
| 4,753,826 A | 6/1988 | Lauman |
| 4,829,134 A | 5/1989 | Sakamoto et al. |
| 4,980,400 A | 12/1990 | Sessa et al. |
| 5,225,455 A | 7/1993 | Sessa et al. |
| 5,618,860 A | 4/1997 | Mowrer et al. |
| 5,887,804 A * | 3/1999 | Hansen ................. 241/24.3 |
| 5,935,510 A | 8/1999 | Hansen |
| 6,032,883 A * | 3/2000 | Hansen ................. 241/24.3 |
| 6,203,405 B1 | 3/2001 | Hansen |
| 6,284,186 B1 | 9/2001 | Hansen |
| 6,383,560 B1 | 5/2002 | Ledbetter |

FOREIGN PATENT DOCUMENTS

WO    WO 96/23587    *  8/1996

* cited by examiner

*Primary Examiner*—Erma Cameron
(74) *Attorney, Agent, or Firm*—Madson & Metcalf

(57) ABSTRACT

A thermosetting plastic composition comprising thermosetting plastic resin with comminuted recycled glass powder as a filler. The composition may be up to 80% by weight glass powder. The recycled glass powder has non-uniform, rounded edges, is comminuted without the use of grinding compounds. A variety of thermosetting plastic resins may be used to form the composition. A method of protecting surfaces with a thermosetting plastic coating is also disclosed. A kit for producing a thermosetting plastic coating containing thermosetting plastic resin and comminuted recycled glass powder is also disclosed.

20 Claims, No Drawings

THERMOSETTING PLASTIC COMPOSITION

This application claims the benefit of U.S. Provisional Application No. 60/394,350, filed Jul. 8, 2002.

BACKGROUND

1. The Field of the Invention

The present invention is related to thermosetting plastic compositions made with comminuted recycled glass particles and powder as a filler and reinforcement.

2. The Background of the Invention

Thermosetting plastics are commercially accepted as protective and decorative coatings for surfaces made of a variety of materials, including steel, aluminum, wood, and concrete. The basic thermosetting plastic composition is made of a thermosetting plastic resin and a hardener. As used herein, the term thermosetting plastic resin is intended to include both the resin and the hardener. Epoxy and phenolic plastic resins are common thermosetting plastic resins that can be used to produce these thermosetting plastic compositions.

Although pure thermosetting plastic compositions protect surfaces, a variety of aggregates are commonly added to the thermosetting plastic resin to modify the plastic's characteristics. For example, it is common to add coloring agents to epoxy resin for decorative purposes. Other aggregates are commonly added to thermosetting plastics to alter mechanical properties such as the resistance to impact and abrasion, the tensile and compressive strength, and the resistance to various chemicals and chemical reactions. As used herein, a plastic "filler" is an ingredient which has a cost substantially less than the cost of the plastic used. As used herein, a plastic "reinforcement" is an ingredient which is included in the plastic to provide a desired property or characteristic.

Specially manufactured glass has been used as an ingredient in thermosetting plastics. For instance, commercially available glass fibers or whiskers, having a length of about ¼ inch, have been added to plastic to make the product tougher and to improve the yield stress. Manufactured glass beads (either solid or hollow) have also been used in thermosetting plastics to improve to toughness and abrasion resistance of the plastic. However, the manufactured glass fibers and beads cost approximately the same as the plastic used. The manufactured glass fibers and beads have been used solely to provide desired mechanical properties in the finished plastic product. They have not been used as a filler in plastic to reduce manufacturing costs.

One commercially successful thermosetting composition uses silica sand as an ingredient in thermosetting plastics used as a protective coating on floors or other surfaces exposed to excessive wear. In this commercially successful application, the silica sand is mixed with the thermosetting plastic resin and then a thin layer of the resulting composition is applied to the surface. The layer is then allowed to cure, or harden. The desired protection is typically obtained by applying multiple layers of the thermosetting plastic and silica sand composition. Before applying each additional layer, silica sand is spread over the previous layer while it is curing. The silica sand becomes affixed in the thermosetting plastic as it cures. The surface of the previous layer is then sanded in preparation for application of the additional layer of thermosetting plastic and silica sand composition.

The benefits that silica sand provides to thermosetting plastics come at considerable expense. The Material Safety Data Sheet for silica sand, also known as crystalline silica, identifies several potential health effects presented by inhalation of silica sand dust. Respirable crystilline silica is produced in many circumstances, such as, for example, sandblasting, concrete cutting, mining, and mixing sand with cement. Essentially anything that can disrupt the crystalline structure of the silica sand may produce respirable crystalline silica. Silicosis is a known, chronic, adverse health effect from regular exposure to respirable crystalline silica. Silicosis results in a fibrosis of the lungs that is often progressive leading to disability and death. Additionally, silicosis increases the risk of tuberculosis. These known health risks have caused the Office of Occupational Health and Safety to set a low permissible exposure level (PEL) for crystalline silica of 10 $mg/m^3$. In addition to the risks of silicosis and tuberculosis, studies have shown that crystalline silica is a carcinogen and that workers exposed to respirable crystalline silica have an increased risk of developing connective tissue disorders, chronic kidney disease, and end-stage renal disease. These additional studies have caused several agencies to established recommended exposure levels as low as 0.05 $mg/m^3$.

Common methods of forming protective coatings from thermosetting plastic with silica sand produce several opportunities for respirable crystalline silica to be released into the air near workers applying the coating. For example, crystalline silica dust is released when the silica sand is added to the thermosetting plastic resin. Additionally, respirable crystalline silica is released into the air when the silica sand is spread over the curing layer of epoxy in preparation for additional layers. Moreover, the worker sanding the cured epoxy layer coated with silica sand will create respirable crystalline silica in the sanding area. An employee working on any of these steps would be exposed to respirable crystalline silica and incur increased risks of the adverse health effects discussed above.

Executive Order 13101, entitled Greening the Government Through Waste Prevention, Recycling, and Federal Acquisition, recently defined the federal government's position towards recycling and the use of natural resources. That order declared that "it is the national policy to prefer pollution prevention" and recycling. Consistent with that policy, the order directed each of the executive agencies to develop a plan for increasing the acquisition of recycled products and environmentally preferable products. The Executive Order itself does not set any specific requirements on the agencies but does require the Environmental Protection Agency (EPA) to regularly update a list of "items that are or can be made with recovered material." Furthermore, the Order requires that agencies modify their procurement programs to prefer purchasing an item containing recovered materials once the EPA has identified the item. Several other requirements in the Executive Order illustrate the strength of the federal government's commitment to reducing waste through promoting and favoring recycling.

Therefore, it would be an improvement in the state of the art to provide a thermosetting plastic that is reinforced with a low-cost filler material to further reduce manufacturing costs. Furthermore, it would be an advancement in the art to provide a reinforced thermosetting plastic with a filler ingredient that does not present health risks to those making or using the plastic. Additionally, it would be an improvement in the art to provide a reinforced thermosetting plastic whose filler ingredient comprises a recycled material that is inexpensively produced and furthers the national policy in favor of recycling. Such a thermosetting plastic composition and methods of applying the same to protect surfaces are described herein.

BRIEF SUMMARY OF THE INVENTION

The present invention is directed towards a thermosetting plastic composition comprising uncontaminated, comminuted, recycled glass powder filler having non-uniform, rounded edges which has been comminuted without the use of grinding compounds and thermosetting plastic resin. The composition comprises up to 80% by weight comminuted glass powder filler. As used herein, the term "glass powder" refers to powders or particles smaller than about 8 mesh. The glass powder filler has a size less than about 8 mesh, preferably ranging from about 20 mesh to about 30 mesh. The glass powder filler may be as small as about 100 mesh or smaller. Preferably, the thermosetting plastic composition comprises between about 30% and about 80% by weight comminuted glass powder filler.

The present invention is also directed towards a kit for producing a thermosetting plastic coating. The kit comprises uncontaminated, comminuted, recycled glass powder filler having non-uniform, rounded edges which has been comminuted without the use of grinding compounds and a thermosetting plastic resin. The thermosetting plastic coating is formed when the uncontaminated glass powder filler and the thermosetting plastic resin are combined. The comminuted, recycled glass powder filler has a size less than about 8 mesh, preferably ranging from about 20 mesh to about 30 mesh. The glass powder may be as small as about 100 mesh or smaller. The coating comprises up to about 80% by weight comminuted glass powder filler, preferably the coating comprises between about 30% and about 80% comminuted glass powder filler.

Additionally, the present invention is directed to a method of protecting a surface with a thermosetting plastic coating. The method comprises the steps of obtaining a quantity of uncontaminated, comminuted, recycled glass powder filler having non-uniform, rounded edges which has been comminuted without the use of grinding compounds, combining the comminuted glass powder filler with a quantity of thermosetting plastic resin to form a thermosetting plastic composition, and coating a surface with the composition. The composition comprises up to about 80% by weight comminuted glass powder filler and preferably between about 30% and 80% by weight comminuted glass powder filler. The comminuted glass powder filler in the composition has a size less than about 8 mesh, preferably the glass powder has a size ranging from about 20 mesh to about 30 mesh. The glass powder may be as small as about 100 mesh or smaller. The coating step may be performed with an applicator such as a brush, roller, trowel, or similar spreader. The coating step may be performed so that the resulting thermosetting plastic layer on the surface ranges from about ⅛ inch thick to about ½ inch thick. Preferably, the resulting thermosetting plastic layer is about ¼ inch thick.

DETAILED DESCRIPTION OF THE PREFERRED EMBODIMENTS

The present invention is directed to thermosetting plastic compositions and methods of protecting surfaces with thermosetting plastic compositions. The thermosetting plastic compositions of the present invention comprise uncontaminated, comminuted recycled glass powder filler. As used herein, the term "glass powder" refers to powders or particles smaller than about 8 mesh. The comminuted recycled glass powder preferably has a particle size smaller than about 8 mesh, and preferably in the range from about 20 mesh to about 30 mesh. Sizes as small as about 100 to about 400 mesh or smaller can be used in some applications.

Suitable recycled glass powder can be obtained as a byproduct from the methods and apparatus described in WO 96/23587 entitled "Methods for Recycling Glass and Uses of Recycled Glass" and in U.S. Pat. No. 5,887,804 entitled "Apparatus for Comminuting Glass", which are incorporated herein by reference.

The disclosed methods and apparatus quickly and inexpensively convert waste glass into a form that can be safely handled. The processes involve "suspended attrition" in which the glass particles are suspended by rotating hammers and are caused to roll within a suspension chamber. Suitable recycled glass powder can also be obtained by introducing glass powder into a suspension chamber, described above, to round the glass powder edges. Preferably, the comminuted glass powder having non-uniform, rounded edges is free from contaminants such as grinding compounds, organic waste, metals, and inorganic waste materials.

By using multiple mesh screens of various sizes, recycled glass powder can be provided with a specific size or size range, typically ranging from about 8 to about 100 mesh to smaller than 400 mesh, and as small as 1000 mesh. It has been discovered that using smaller glass powder enables greater concentrations of comminuted recycled glass in the thermosetting plastic.

Consistent with the present invention, the comminuted recycled glass powder filler can be used with a variety of different thermosetting plastic resins including epoxy, phenolic, polyester, silicone, urethane, and vinylester resins. Epoxy is a currently preferred resin. Reference to thermosetting plastic resins throughout this application is intended to refer to the plastic resin and any required catalyst or hardener.

As used herein, the term "glass" encompasses all inorganic products which have cooled to a rigid solid without undergoing crystallization. Conventional, recyclable waste glass can be used, including plate glass, glass bottles and other molded glass shapes, and waste glass fibers. The term "glass" is also intended to include other glassy materials including ceramic materials such as porcelain. As used herein, comminuted recycled glass is intended to include comminuted manufactured glass, regardless of the origin of the glass.

The floors of many factories, warehouses, laboratories and other institutions are exposed to very harsh conditions including impacts, scratches, and chemical spills. Therefore, there is a significant need for protective coatings. It has been discovered that comminuted recycled glass powder can be used as a filler in thermosetting plastic coatings used to protect floors and other surfaces. Recycled glass is very inexpensive, currently costing about $0.15/pound, while typical plastic resin costs between $0.55/pound to $0.90/pound. Comminuted recycled glass powder can be added to plastic in concentrations up to about 80% by weight and higher. The actual concentration will depend upon the base resin used and the desired application. For instance, for heat insulation applications, high concentrations of glass powder, up to 80% and more, can be used. To obtain improved stiffness, smaller amounts of glass powder, from 7% to 10%, can be used. To obtain good abrasion resistance, from 30% to 45% glass powder can be used. Most applications will use glass powder at a concentration in the range from 5% to 45% by weight. Thus, it is possible to substantially reduce the costs of thermosetting plastic coatings used to protect floors and other surfaces by using recycled glass powder as a filler.

Thermosetting plastic coatings containing glass powder filler possess improved heat resistance compared to unfilled coatings. The glass powder filled plastic coatings also show good particle distribution, flex modulus, and abrasion resistance, lower thermal conductivity, improved toughness, durability, and creep resistance. However, glass powder filled plastic coatings tend to possess lower impact resistance compared to unfilled parts. The user must balance the desired improvements with the lower impact resistance. In practice, one would maximize the glass powder filler content while maintaining an acceptable impact resistance.

Advantageously, recycled glass powder can be used in a variety of different applications for thermosetting plastics including molded plastic materials. The present invention is particularly useful in reducing the manufacturing costs of thermosetting plastic coatings. The recycled glass powders can be used in conjunction with conventional mineral additives, such as talc, mica, calcium carbonate, and others. In many applications, the recycled glass powder can replace the mineral additives. Given that the mineral additives, depending on quality, currently sell for about $0.40 to $0.60 per pound, and the recycled glass powder currently sells for about $0.15 per pound, the recycled glass powder functions as a low-cost filler, even when replacing the mineral additives.

The thermosetting plastic compositions of the present invention made with recycled glass powder filler are effective coatings for a variety of surfaces. A currently preferred method of protecting a surface within the scope of the present invention includes the steps of obtaining a quantity of uncontaminated, comminuted recycled glass powder filler and combining the glass powder filler with a quantity of thermosetting plastic resin to form a thermosetting plastic composition. The surface is then coated with the composition to form a protective layer.

The comminuted glass powder filler has non-uniform, rounded edges and has been comminuted without the use of grinding compounds. The glass powder filler has a size less than about 8 mesh, preferably between about 20 and about 30 mesh. Glass powder as small as about 100 to 400 mesh or smaller may also be used. As the size of the recycled glass powder filler decreases, greater concentrations of glass powder are attainable, up to 80% by weight comminuted recycled glass powder filler. Preferably, the concentration of glass powder filler in the composition ranges between 30% and 80% by weight.

The coating step may be performed with an applicator, such as a brush, roller, trowel, or similar spreading device. Preferably, the applicator will facilitate even spreading of the composition over the surface to ensure a smooth surface. The thermosetting plastic composition may be poured on the surface and then spread with an applicator, or the composition may be applied to the surface according to the needs of the user. The method of protecting a surface with thermosetting plastic compositions of the present invention may produce a coating on the surface ranging from about ⅛ inch thick to about ½ inch thick with ¼ inch thick coatings being currently preferred.

Thermosetting plastic protective floorings with reinforcing aggregates such as silica sand or manufactured glass have generally been installed by professionals because of the high costs and fragility of the manufactured glass and the health risks of the silica sand. The comminuted recycled glass powder filler of the present invention does not present the same concerns and is suitable for inclusion in kits designed for consumer application of thermosetting protective coatings.

The recycled glass powder is cheaper than the thermosetting plastic resins and the manufactured glass, and the glass powder loses its fragility in the recycling process. Additionally, the rounded edges of the glass powder filler do not present the hazards of handling glass crushed or recycled through more conventional methods. Furthermore, respirable glass powder is classified as merely a nuisance dust by the federal agencies. This classification means that respirable glass powder does not present adverse health effects.

Consistent with the present invention, a kit for producing a thermosetting plastic coating may include a quantity of uncontaminated, comminuted recycled glass powder filler having non-uniform, rounded edges which has been comminuted without the use of grinding compounds and a quantity of thermosetting plastic resin. The glass powder may be included in the kit as a separate ingredient or, preferably, the glass powder may be pre-mixed with either the hardening agent or the plastic resin that comprise the thermosetting plastic resin in the kit. The thermosetting plastic coating is formed when all of the ingredients, the glass powder filler and the thermosetting plastic resin, are combined. The recycled glass powder filler in the kit has a size less than 8 mesh, preferably ranging from about 8 mesh to about 100 mesh. Glass powder filler ranging from about 100 mesh to about 400 mesh or smaller may also be used. More preferably, the size of the glass powder filler is between about 20 mesh and about 30 mesh. The coating prepared from the kit may comprise up to 80% by weight comminuted glass powder filler, preferably ranging from 30% to 80% by weight glass powder filler.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention and the scope of the invention is, therefore, indicated by the appended claims rather than by the foregoing description. All changes which come within the meaning and range of equivalency of the claims are to be embraced within their scope.

What is claimed is:

1. A method of protecting a surface, comprising:
   obtaining a quantity of uncontaminated, comminuted, recycled glass powder filler having non-uniform, rounded edges which has been comminuted without the use of grinding compounds, wherein the glass powder has a size less than about 8 mesh;
   combining the comminuted glass powder filler with a quantity of thermosetting plastic resin to form a thermosetting plastic composition, wherein the composition comprises up to about 80% by weight comminuted glass powder filler; and
   coating a surface with the thermosetting plastic composition.

2. A method as defined in claim 1, wherein the glass powder has a size ranging from about 8 mesh to about 100 mesh.

3. A method as defined in claim 1, wherein the glass powder has a size ranging from about 20 mesh to about 30 mesh.

4. A method as defined in claim 1, wherein the glass powder has a size less than about 100 mesh.

5. A method as defined in claim 1, wherein the thermosetting plastic composition comprises between about 30% and about 80% by weight comminuted glass powder filler.

6. A method as defined in claim 1, wherein the coating step is performed with an applicator.

7. A method as defined in claim 1, wherein the coating on the surface ranges from about ⅛ inch thick to about ½ inch thick.

8. A method as defined in claim 1, wherein the coating on the surface is about ¼ inch thick.

9. A method as defined in claim 1, wherein the thermosetting plastic resin is selected from epoxy, phenolic, polyester, silicone, urethane, and vinylester resins.

10. A method as defined in claim 9, wherein the thermosetting plastic resin is an epoxy resin.

11. A method of protecting a surface, comprising:

obtaining a thermosetting plastic coating composition, the coating composition comprising uncontaminated, comminuted, recycled glass powder filler having non-uniform, rounded edges which has been comminuted without the use of grinding compounds, wherein the glass powder has a size less than about 8 mesh, and thermosetting plastic resin, wherein the thermosetting plastic coating composition is formed when the uncontaminated glass powder filler and the thermosetting plastic resin are combined, wherein the coating composition comprises up to about 80% by weight comminuted glass powder filler; and coating a surface with the thermosetting plastic coating composition.

12. A method as defined in claim 11, wherein the glass powder has a size ranging from about 8 mesh to about 100 mesh.

13. A method as defined in claim 11, wherein the glass powder has a size ranging from about 20 mesh to about 30 mesh.

14. A method as defined in claim 11, wherein the glass powder has a size less than about 100 mesh.

15. A method as defined in claim 11, wherein the thermosetting plastic composition comprises between about 30% and about 80% by weight comminuted glass powder filler.

16. A method as defined in claim 11, wherein the coating step is performed with an applicator.

17. A method as defined in claim 11, wherein the coating on the surface ranges from about ⅛ inch thick to about ½ inch thick.

18. A method as defined in claim 11, wherein the coating on the surface is about ¼ inch thick.

19. A method as defined in claim 11, wherein the thermosetting plastic resin is selected from epoxy, phenolic, polyester, silicone, urethane, and vinylester resins.

20. A method as defined in claim 19, wherein the thermosetting plastic resin is an epoxy resin.

* * * * *